US010369961B2

(12) United States Patent
Krishnamurty et al.

(10) Patent No.: US 10,369,961 B2
(45) Date of Patent: Aug. 6, 2019

(54) RETROFIT SEAT BELT SYSTEM

(71) Applicant: UNIVERSITY OF MASSACHUSETTS, Amherst, MA (US)

(72) Inventors: Sundar Krishnamurty, Amherst, MA (US); Douglas Eddy, West Springfield, MA (US); Anne Schewe, Amherst, MA (US); Conrad Zanzinger, Wallhausen (DE)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 15/311,248

(22) PCT Filed: May 22, 2015

(86) PCT No.: PCT/US2015/032218
§ 371 (c)(1),
(2) Date: Nov. 15, 2016

(87) PCT Pub. No.: WO2015/179784
PCT Pub. Date: Nov. 26, 2015

(65) Prior Publication Data
US 2017/0096121 A1    Apr. 6, 2017

Related U.S. Application Data

(60) Provisional application No. 62/002,353, filed on May 23, 2014.

(51) Int. Cl.
*B60R 22/18*    (2006.01)
*B60R 22/22*    (2006.01)
*B60R 22/02*    (2006.01)

(52) U.S. Cl.
CPC ............ *B60R 22/18* (2013.01); *B60R 22/023* (2013.01); *B60R 22/22* (2013.01)

(58) Field of Classification Search
CPC ......... B60R 22/00; B60R 22/18; B60R 22/22; B60R 22/26; B60R 2022/1818; B60R 22/023
See application file for complete search history.

(56) References Cited

U.S. PATENT DOCUMENTS 3,583,764 A * 6/1971 Lohr ...................... B60R 22/26
                                                                297/475
4,632,425 A    12/1986 Barratt
(Continued)

FOREIGN PATENT DOCUMENTS

DE         4333463 A1    4/1995
DE      19629128 A1 *   1/1998   ......... B60H 1/00371
(Continued)

*Primary Examiner* — Laura Freedman
(74) *Attorney, Agent, or Firm* — Cantor Colburn LLP (57) ABSTRACT

Systems and methods for installing retrofit seat belt systems with structural support for the lap and shoulder belts, while at the same time providing a low cost solution. In particular, some, or all of the loads, as required, are shared by an added support structure connected rigidly to a structural base, e.g., of a bus or other vehicle, via a base plate. As such the present teachings achieve compartmentalization around passengers in the event of a crash. Furthermore, unlike prior retrofit seat belt designs, the systems and methods of the present teachings uniquely facilitate a seamless transition for the different seat configurations and do not require complete replacement of the seats.

10 Claims, 10 Drawing Sheets

(56) References Cited

U.S. PATENT DOCUMENTS

| | | | | |
|---|---|---|---|---|
| 4,889,389 A * | 12/1989 | White | B60N 2/163 | 297/344.18 |
| 5,015,010 A * | 5/1991 | Homeier | B60N 2/00 | 280/808 |
| 5,020,856 A * | 6/1991 | George | B60R 22/18 | 280/801.1 |
| 5,246,271 A * | 9/1993 | Boisset | B60N 2/20 | 297/362.13 |
| 5,265,909 A | 11/1993 | Verbeski | | |
| 5,390,982 A * | 2/1995 | Johnson | B60R 22/20 | 297/410 |
| 5,564,785 A | 10/1996 | Schultz et al. | | |
| 5,599,070 A * | 2/1997 | Pham | B60R 22/26 | 280/808 |
| 5,624,135 A | 4/1997 | Symonds | | |
| 5,746,476 A * | 5/1998 | Novak | B60N 2/242 | 297/216.13 |
| 6,065,777 A * | 5/2000 | Merrick | B60R 22/19 | 280/801.1 |
| 6,123,388 A * | 9/2000 | Vits | B60N 2/688 | 297/216.13 |
| 6,312,056 B1 | 11/2001 | Murphy et al. | | |
| 6,485,098 B1 * | 11/2002 | Vits | B60N 2/242 | 297/216.13 |
| 6,533,320 B1 * | 3/2003 | Langensiepen | B60R 22/02 | 280/801.1 |
| 6,676,219 B1 | 1/2004 | Brewer | | |
| 6,802,537 B1 * | 10/2004 | Tolfsen | B60N 2/508 | 280/727 |
| 7,510,245 B2 | 3/2009 | Okazaki et al. | | |
| 7,651,134 B2 | 1/2010 | Rosso | | |
| 8,371,656 B2 | 2/2013 | McCauley et al. | | |
| 8,764,113 B2 | 7/2014 | Smith et al. | | |
| 2002/0003365 A1 | 1/2002 | Yamaguchi et al. | | |
| 2005/0110328 A1 | 5/2005 | Kennedy, Sr. | | |
| 2005/0184569 A1 | 8/2005 | Penley et al. | | |
| 2008/0084056 A1 | 4/2008 | Wright | | |
| 2008/0100051 A1 | 5/2008 | Bell et al. | | |
| 2008/0246265 A1 | 10/2008 | Walton et al. | | |
| 2009/0008983 A1 | 1/2009 | Ghatge | | |
| 2009/0079252 A1 | 3/2009 | Liehr, Jr. et al. | | |
| 2011/0210598 A1 | 9/2011 | Kovac | | |
| 2013/0093234 A1 * | 4/2013 | Jones | A47C 9/002 | 297/463.1 |
| 2018/0319360 A1 * | 11/2018 | Clyde | B60N 2/012 | |

FOREIGN PATENT DOCUMENTS

| | | | |
|---|---|---|---|
| DE | 19745634 A1 | 4/1999 | |
| EP | 0511100 A1 * | 10/1992 | B60N 2/1695 |

* cited by examiner

BROKEN PEDESTAL AFTER CRASH TEST

FIG. 10c

RETROFIT SEAT BELT SYSTEM

CROSS-REFERENCE TO RELATED APPLICATIONS

This application is a U.S. national stage application under 35 U.S.C. 371 of co-pending International Application No. PCT/US15/32218, filed on May 22, 2015, entitled RETROFIT SEAT BELT SYSTEM, which in turn claims priority to U.S. Provisional Patent Application No. 62/002,353, filed on May 23, 2014, the contents of which are incorporated by reference herein in their entirety for all purposes.

TECHNICAL FIELD

The present disclosure relates generally to seat belt systems and, more particularly, to retrofitting seat belt systems on existing vehicles.

BACKGROUND

In the U.S., every year, an average total of 270 buses were involved in fatal crashes. The exact number for the period of 2001 to 2011 is documented by the National Highway Traffic Safety Administration (NHTSA) (8) In the US, new buses on the road are equipped with seat belts, (9) but a significant number of old buses do not provide seatbelts. (10).

In case of a bus accident, involving a frontal crash or a side impact, seatbelts can prevent passengers from being ejected from their seats, and also protect passengers from collisions into the front seat. All these circumstances can cause serious injuries. Seat belt designs can be divided into the two most common versions: Two-point lap belts and three-point lap/shoulder belts. However, they are not equally safe. Lap belts do not offer sufficient safety especially in frontal crashes. In these cases the passenger's head is not protected from hitting the seat in front what may result into head or upper torso injuries. (11) Conversely, three-point seatbelts prevent injuries and ejections (12). A NHTSA safety research has shown that three-point seatbelts can reduce fatalities by up to 77 percent. This result can mainly be traced back to the fact that seat belt prevent ejections of passengers in case of a rollover. (2) Rollover crashes represent the most dangerous scenario. The data from the Fatality Analysis Reporting System Encyclopedia (FARS) shows that for the period of 2000 to 2009, 55 percent of the crashes resulting in fatalities were rollover crashes. Due to the fact that motor coaches are traditionally designed with a luggage storage room underneath the passenger compartment, these vehicles have a relatively high center of gravity. If the bus is occupied by many passengers, it gets even more top heavy. This means that motor coaches are highly exposed to the risk of turning over in a crash (13). Therefore, especially for buses, it is important to install three-point seat belts, to provide high passenger safety. As well as for rollovers, the installation of seat belts significantly increases passenger safety in frontal or side crashes. (2) Statistically three point seat belts safe a live every seven seconds. Therefore the German patent office has declared the invention of the tree point seat belt, made by Volvo in 1959, as one of the eight most important inventions within the last 100 years. (19; 20; 21; 22)

A literature survey of bus and coach incidents has outlined that fatal crashes occur more frequent in rural roads, (11) where motor coaches travel a lot of times. This fact implicates that motor coaches, in contrast to transit buses, definitely need restraint systems to protect passengers in case of an accident.

In Australia, two momentous accidents in 1989 involving motor coaches lead to legislation, making three point seat belts mandatory in the country. Since then, various serious bus accidents have occurred but no fatal or disabling injuries for occupants wearing seat belts have been documented. (14) An example for the efficiency of seatbelts in terms of occupant protection is given: A bus built in 1996 was involved in a collision with a culvert. The impact speed was approximately 85 km/h, which is an equivalent of 52 mph. 47 of the 52 occupants used their seatbelts. Only the unbuckled persons came up with injuries, including fatal injuries for a relief driver who was thrown out of the window and a child sleeping in the aisle. The remaining unbuckled passengers came into collisions with the front seat. (14)

The fact that passengers travelling on buses are not only exposed to the danger of sustaining a trauma by being ejected from their seats, but also could they get hurt by other unrestrained passengers being ejected against them, has to be considered. (14) For motor coaches offering space for approximately 55 passengers, (15) collisions between passengers also poses a significant risk. For this reason the installation of passenger restraint systems is essential.

In a motor coach accident in Tallulah, La. on Oct. 13, 2003, 16 pairs of seats were ripped off the floor. "Passengers [were] trapped among and underneath the seats".

Even though the previously mentioned studies have shown, that passenger safety can be significantly improved, the National Highway Traffic Safety Administration from the Department of Transportation has decided not to require retrofit seatbelts for motor coaches. (23) The Department of Transportation names the high efforts on reinforcement of the bus structure, as well as the high costs for retrofitting as reasons, why retrofit seat belts are not feasible.

It is estimated that retrofitting a vehicle with lap belts would cost $6,000, if the seat belts can be attached to the vehicle structure without any strengthening needed. If reinforcement is needed, the costs are estimated to be up to $34,000. A retrofit of lap/shoulder seat belts that meets the requirements imposed in FMVSS No. 210 is estimated to cost $40,000 per bus. With 29,325 buses on the road, the occurring costs for the motor carrier industry are expected to be too high. These numbers are highly doubted by Jaqueline Gillan, (13) the vice president of Advocates for Highway and Auto Safety. Advocates for highway and Auto Safety is an alliance with the objective, to make US roads safer. (24) Gillan calls the cost figures given by the motor coach industry "highly inflated and unreliable". According to Gillan, an "anonymous and undated document" that does not name "the sources of [the] estimates" has been used to lobby against the new safety requirements. In the last few years, a law has been discussed, which prescribes the safety standards for motor coaches. Finally the National Highway Traffic Safety Administration (NHSTA) has decided not to undertake rulemaking on retrofitting motor coaches with seat belts. The reasons that were named for that decision were the estimated costs for the retrofit of seat belts and the fact that there is no existing solution available. Therefore travelling on these old buses is not safe.

Even though it has been heavily discussed, a rule released on 25 Nov. 2013, requires "seat belts for every passenger seating position for all new over-the-road buses" (Page 2 (16)), but does "not [ . . . ] require retrofitting of used buses with seat belts" (page 5 (16)). This rule is called 49 CFR Part 571—Federal Motor Vehicle Safety Standards (FMVSS).

The rule has been released by the US Department of Transportation (DOT)—National Highway Traffic Safety Administration (NHTSA). One of the main reasons why the US Department of Transportation has decided not to require retrofitting buses with seat belts is that the estimated costs for that process are about $40,000 per bus, (page 128 (17)) which will probably cause serious economic problems for the bus owners. If it can be proven, that it is possible to provide a solution that will allow retrofitting for about $10,000 per bus, either the US Department of Transportation might change the rule on retrofitting, or bus owners will voluntarily install seat belts in their buses. Both will help to improve passenger safety for people travelling by bus.

Conventional solutions for restraining passengers, such as disclosed in prior art, fail to adequately address the existing problem.

Notably, in addition to seatbelts, even airbags or rigid bars, as known for rollercoaster applications, could take over the task of restraining passengers (note that since a low cost solution is required, air bags can be eliminated from the consideration). Thus, e.g., US Patent Application USPA 20110210598 A1, Restraint System for Vehicle. (25) presents an added rigid bar for upper torso restraint for police applications. Due to the fact that over-road bus trips are likely to last several hours, the design may not be appropriate for bus type applications, since it will negatively affect passenger comfort.

Another example of a restraint system that cannot be categorized as a seat belt, is US Patent 20090079252 A1, Cross-Cross Harness System for Use with Seats. (26) US Patent 20090079252 A1 also retrofits into a seat. The configuration may be very uncommon for people to use, so it will not be considered as a competitor for retrofitting seats with a restraint system. A system that is totally new to the passengers is undesirable, because people should be able to use the restraint system without needing a safety instruction.

The prior art also discloses a number retrofit seat belt options, most of which can be categorized as portable seatbelts. U.S. Pat. No. 8,371,656 B2, Portable Safety Belt (27), is an example of a design with a seat mounted seat belt assembly. The seat belt assembly consists of a single strap that can be mounted to the back rest of an existing seat, and at the same time be used as a lap belt. (27). U.S. Pat. No. 5,624,135 A, Portable Seat Belt (29), also discloses a portable seatbelt for retrofitting to a certain seat design. The portable seat belt consists of a system of straps that can be wrapped around the backrest of a bus seat and strap up a person safely to the seat. A further example of a portable seatbelts is disclosed in US Patent 20080246265 A1, Over-the shoulder seatbelt. (30) This portable seatbelt design enables the seatbelt to be carried around by the passenger. One disadvantage of these designs is that in case of an accident, all the forces that act on the restrained passenger are transmitted to the bus floor via the pedestal of the bus seat. Bus seats, however, are generally not designed to withstand these forces. Thus, portable seatbelts present added liability and safety concerns and therefore they adequately address the problem of retrofitting motor coaches in the US. (10)

Other prior art solutions that have been proposed may be categorized as new seats (i.e. for replacing the old seats without seatbelts. For example, German Patent DE 19745634 C2, Passenger seat with seat belt attachment to the column, (31) discloses a new seat design with an integrated seat belt system. The cost of purchasing new seats, however, represents a near prohibitive disadvantage.

Several examples for seat mounted seatbelt systems can be found in the prior art. U.S. Pat. No. 4,632,425 A, Passenger Restraint System, (33) is a design from 1985 that was developed for retrofitting school busses with seatbelts. Additionally U.S. Pat. No. 6,676,219 B1, Passenger Restraint Assembly for School Buses, (34) offers a restraint assembly with three straps that can be attached to the seat frame. In both designs the seat frame is required to absorb the forces during a crash.

In contrast to cars, the availability of anchor points for seat belts in buses is limited. The anchor point for the shoulder strap support in a car is often mounted to the side wall of the vehicle frame. This is not an option for the retrofit design, because especially for aisle seats, anchoring points at the side wall cannot be found. As discussed in the previous section, using parts of the seat as an anchor point, as in U.S. Pat. No. 7,651,134 B2, cannot be considered as an option for retrofit seat belts. Another example of this deficiency is U.S. Pat. No. 6,312,056 B1, Occupant Restraint System with Compartmentalization. It provides a retrofit seatbelt design with the retractors mounted at the bottom of the seat.

German Patent DE 4333463 A1, Motor caravan with a fastening device for safety belts (37) discloses a T-shaped support structure for belt retrofit on a caravan. The design can be considered cumbersome for a motor coach (note that the it is specifically designed for the use for caravans). In particular, structure and mounting of the support will not work for motor coaches.

As noted above, one possible approach to retrofitting motor coaches with seatbelts is to replace the seats with new seats that have integrated seatbelts. Unfortunately, this solution is significantly more expensive than installing a retrofit seatbelt. Thus, as discussed previously, new seats cannot be considered as the solution for retrofitting motor coaches. (10) Finding new seats that are designed to withstand the forces that are applied in crash scenarios is not difficult. A great number of new buses are already equipped with seats that provide seat belts. (9) An example for a replacement seat with an integrated seatbelt is U.S. Pat. No. 5,564,785 A, Seat Frame Assembly for Motor Vehicle.

The use of seatbelts is essential in order to provide passenger safety for motor coaches. Considering the fact that still a significant number of US coaches are not equipped with seatbelts, a compelling need for a retrofit system is created. The prior art, as discussed herein, has not provided an adequate solution that offers a safe and cost efficient retrofit system for motor coaches.

Thus, there exists a need for improved low-cost retrofit seatbelt solutions for motor coaches. Advantageously, passenger safety can be significantly increased by providing a well designed restraint system that is able to prevent the ejection of the passenger in case of an accident. This statement is evidenced by the NHTSA safety research. (2). Bringing the problem to a point, passengers have to be protected from injuries that can occur during accidents.

SUMMARY

Systems and methods for installing retrofit seat belt systems in motor coaches, while at the same time providing a low cost solution, are disclosed herein.

These teachings include the feature of adequate structural support for the lap and shoulder belts. With the present teachings, some, or all of the loads, as required, are shared by an added center support structure connected rigidly to the structural base of the bus via a base plate (e.g., as further described herein in as depicted in the accompanying figures). As such the present teachings achieve compartmentalization, which is a safety envelop around passengers in the event of a crash, by enabling the availability and usability of seatbelts in motor coaches. Furthermore, unlike prior inventions of retrofits, the present teachings uniquely facilitate a seamless transition for the different seat configurations of motor coaches. The enhanced configuration has the unique feature of an invisible perception to a passenger integrated into an existing seat design. Finally, this retrofit design does not require complete replacement of all the seats in a motor coach. In the present teachings, based on the design and condition of the motor coach seats, the strength of the center support can be uniquely designed and customized to support the seat belt design, while maintaining the integrity of the existing bus frame structure. Therefore, the present teachings can be expected to be universal and economical.

In one or more embodiments, the system of these teachings for retrofitting a motor coach seat with seatbelts includes a central base plate component disposed surrounding a central plane of the motor coach seat and operatively attached to a motor coach floor, a first seat belt, first and second ends of the first seat belt being attached to a first portion of the central base plate component, the first portion located on one side of the central support, and a second seat belt, first and second ends of the second seat belt being attached to a second portion of the central base plate component, the second portion located on another side of the central support.

In other embodiments, the system of these teachings for retrofitting a motor coach seat with seatbelts also includes a shoulder strap structural component extending from the central base plate component to a location above a top of a back support section of the motor coach seat, the shoulder strap structural component operatively attached to the central base plate component, the having two shoulder strap guide components operatively attached at the location above the top of the back support section, a first shoulder strap, attached at one end to one point in a lap portion of the first seat belt and at another end to a first retractor component, the first retractor component disposed and operatively attached to at least one of the shoulder strap structural component or the central base plate component, the first shoulder strap extending from the first retractor component to a first shoulder strap guide component substantially along the shoulder strap structural component and from the first shoulder strap guide component to the one point in the lap portion of the first seat belt, and a second shoulder strap, attached at one end to one point in a lap portion of the second seat belt and at another end to a second retractor component, the second retractor component disposed and operatively attached to at least one of the shoulder strap structural component or the central base plate component, the second shoulder strap extending from the second retractor component to a second shoulder strap guide component substantially along the shoulder strap structural component and from the second shoulder strap guide component to the joint in the lap portion of the second seat belt.

The retrofit seatbelt design of these teachings of these teachings is, in one embodiment, a three-point seatbelt design. For embodiments in which the retrofit includes lap belts, the base plate can be used as an anchor point.

For a better understanding of the present teachings, together with other and further objects thereof, reference is made to the accompanying drawings and detailed description.

DETAILED DESCRIPTION

The following detailed description presents the currently contemplated modes of carrying out these teachings. The description is not to be taken in a limiting sense, but is made merely for the purpose of illustrating the general principles of these teachings.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

In order to elucidate the present teachings, the following definitions are provided as used herein.

"Bus." Bus means any of several types of self-propelled vehicles, generally rubber-tired, intended for use on city streets, highways, and busways, including but not limited to minibuses, forty- and thirty-foot buses, articulated buses, double-deck buses, motor coaches, and electrically powered trolley buses, used by public entities to provide designated public transportation service and by private entities to provide transportation service. It is noted that while example systems and methods presented herein may be specifically directed towards retrofitting a motor coach or other Bus type seat with seatbelts, the present disclosure is not limited to such embodiments. Indeed, the systems and methods herein may be used to retrofit any number of similar types of seats regardless of mode of transportation. For example, in some embodiments, the systems and methods presented herein may be adapted for retrofitting similar type seats on a boat, subway, train, or other mode of transportation.

"Motor Coach." According to National Highway Traffic Safety Administration (NHTSA) buses with a gross vehicle weight rating (GVWR) greater than 11,793 kg (26,000 pounds (lb)) are defined as motor coaches. (2)

"National Highway Traffic Safety Administration (NHTSA), Department of Transportation (DOT)." The National Highway Traffic Administration (NHTSA) is a US governmental organization and part of the Department of Transportation (DOT). The agency is in charge of releasing the Federal Motor Vehicle Safety Standards (FMVSS) (3)

"Federal Motor Vehicle Safety Standard (FMVSS)." The Federal Motor Vehicle Safety Standards (FMVSS) specify the US federal regulations and requirements for motor vehicles. (4)

"Motor Coach Enhanced Safety Act (MESA)." The Motor Coach Enhanced Safety Act (MESA) is a bill that was brought before the US House of Representatives. The MESA included regulations to improve safety for passengers on motor coaches. These regulations included mandatory retrofitting of existing buses with seatbelts within one year. The bill was not enacted. ( . . . Source) (5)

"Seat Belt Assembly" Seat belt assembly means any strap, webbing, or similar device designed to secure a person in a motor vehicle in order to mitigate the results of any accident, including all necessary buckles and other fasteners, and all hardware designed for installing such seat belt assembly in a motor vehicle. (p. 1 (6))

"Anchor Point/Anchorage." Anchorage means "any component, other than the webbing or straps, involved in transferring seat belt loads to the vehicle structure." (7)

"Webbing." Webbing means a narrow fabric woven with continuous filling yarns and finished selvages. (p. 2 (6))

"Strap." Strap means a narrow nonwoven material used in a seat belt assembly in place of webbing. (p. 1 (6))

"Buckle." Buckle means a quick release connector which fastens a person in a seat belt assembly. (p. 1 (6))

"Retractor." Retractor means a device for storing part or all of the webbing in a seat belt assembly. (p. 1 (6))

"Baseplate." The Baseplate is a floor mounted device that has been designed as an anchor point for the seat belt webbing.

"Pedestal." Pedestal means the structural components connecting the seat to the floor.

"Hardware." Hardware means any metal or rigid plastic part of a seat belt assembly. (p. 1 (6))

"Shoulder Strap Support." The device that is used to guide the seat belt at the shoulder portion is called shoulder strap support.

"Rollover." A rollover is a crash scenario in which the vehicle turns over.

"Occupant/Passenger." The person sitting in the seat is called occupant or passenger.

"Pelvic restraint." Pelvic restraint means a seat belt assembly or portion thereof intended to restrain movement of the pelvis. (p. 1 (6))

"Upper torso restraint." Upper torso restraint means a portion of a seat belt assembly intended to restrain movement of the chest and shoulder regions. (p. 1 (6))

"Two Point Seat Belt/Lap Belt." A two point seat belt or lap belt is a seat belt that has two anchor points.

"Three Point Seat Belt/Lap-Shoulder Belt." A three point seat belt or lap-shoulder belt is a seat belt with three anchor points.

"Type 1 Seat Belt Assembly." A lap belt is defined as a Type 1 Seat Belt Assembly. The belt is used for "pelvic restraint." (6)

"Type 2 Seat Belt Assembly." A lap and shoulder seat belt is defined as a Type 2 Seat Belt Assembly that is used for "pelvic and upper torso restraints." (6)

"Type 2a Shoulder Belt." A Type 2a shoulder belt is an upper torso restraint for use only in conjunction with a lap belt as a Type 2 seat belt assembly. (6)

Figure 1:
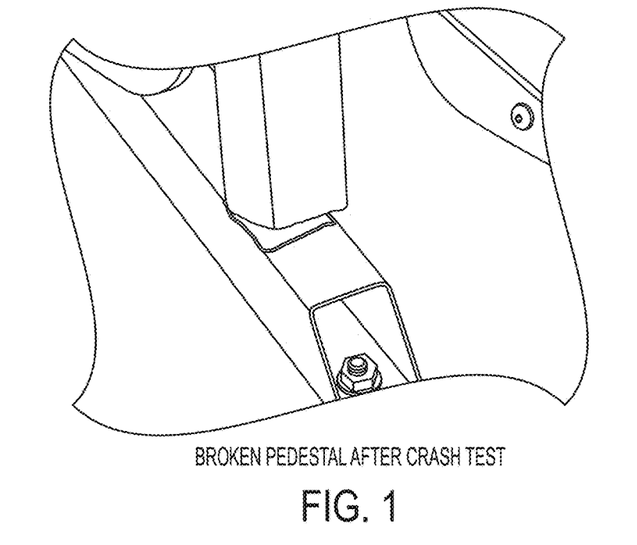
FIG. 1 depicts a broken pedestal of a seat after a crash test.

The easiest way of installing a retrofit seatbelt, is to anchor the seatbelt to the seat frame. The risk of doing that is that, in case of an accident, all the occurring forces have to be transmitted to the bus floor via the pedestal. Since the bus seats were not designed for that case they might not withstand these forces. Crash tests made by NHSTA have showed that the pedestal of seats that were not designed for seatbelts can break. A picture of the broken pedestal can be seen in FIG. 1. The approach of these teachings is, to have one base plate that serves as anchor point for the three connections of the seatbelt. The design presented herein advantageously allows bypassing the seat frame and the pedestal, and transmitting the forces directly to the floor of the bus.

In one or more embodiments, the system of these teachings for retrofitting a motor coach seat with seatbelts includes a central base plate component disposed surrounding a central plane of the motor coach seat and operatively attached to a motor coach floor, a first seat belt, first and second ends of the first seat belt being attached to a first portion of the central base plate component, the first portion located on one side of the central support, and a second seat belt, first and second ends of the second seat belt being attached to a second portion of the central base plate component, the second portion located on another side of the central support.

In other embodiments, the system of these teachings for retrofitting a motor coach seat with seatbelts also includes a shoulder strap structural component extending from the central base plate component to a location above a top of a back support section of the motor coach seat, the shoulder strap structural component operatively attached to the central base plate component, the shoulder strap structural component having two shoulder strap guide components operatively attached at the location above the top of the back support section, a first shoulder strap, attached at one end to one point in a lap portion of the first seat belt and at another end to a first retractor component, the first retractor component disposed and operatively attached to at least one of the shoulder strap structural component or the central base plate component, the first shoulder strap extending from the first retractor component to a first shoulder strap guide component substantially along the shoulder strap structural component and from the first shoulder strap guide component to the one point in the lap portion of the first seat belt, and a second shoulder strap, attached at one end to one point in a lap portion of the second seat belt and at another end to a second retractor component, the second retractor component disposed and operatively attached to at least one of the shoulder strap structural component or the central base plate component, the second shoulder strap extending from the second retractor component to a second shoulder strap guide component substantially along the shoulder strap structural component and from the second shoulder strap guide component to the joint in the lap portion of the second seat belt.

In one instance, the first and second retractor component are as same retractor component. In one embodiment the retractor component is mounted on the baseplate or on the shoulder strap structural component.

The embodiments disclosed herein have a number of advantages over conventional solutions. Some of those advantages include being able to mount the central baseplate onto a floor track providing better performance during a crash, providing a retrofit in which the passengers' freedom of leg movement is not affected, and transmitting the loads from the shoulder strap guide component back to the baseplate through the shoulder strap structural component.

In order to better illustrate these teachings, exemplary embodiments depicted in the figures are presented herein. It should be noted that the systems and methods of the present disclosure are not limited to the depicted exemplary embodiments. Rather, aspects, features and advantages of the disclosure will be apparent from the description of the illustrated examples and accompanying drawings.

Figure 2A:
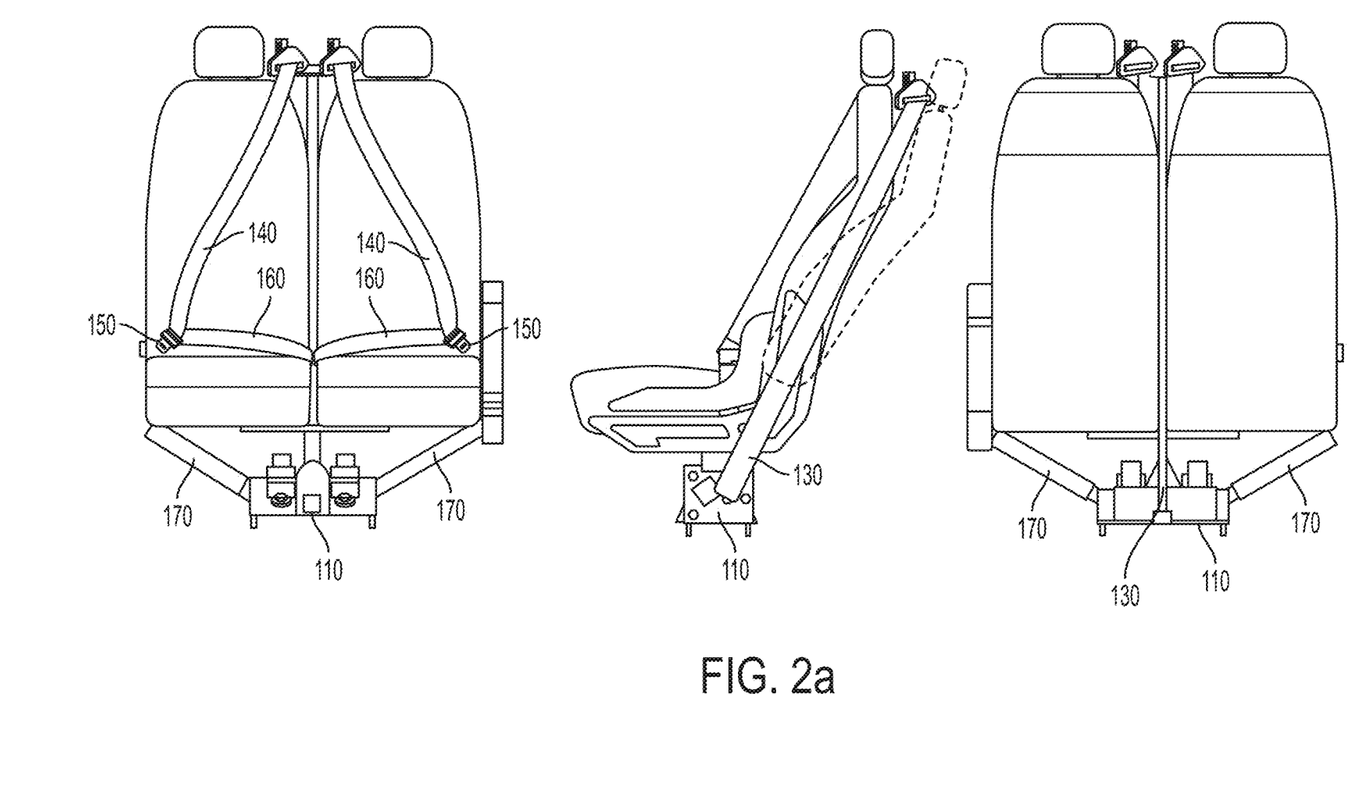
FIG. 2a shows an example embodiment of a retrofit seatbelt design of these teachings.
Figure 2B:
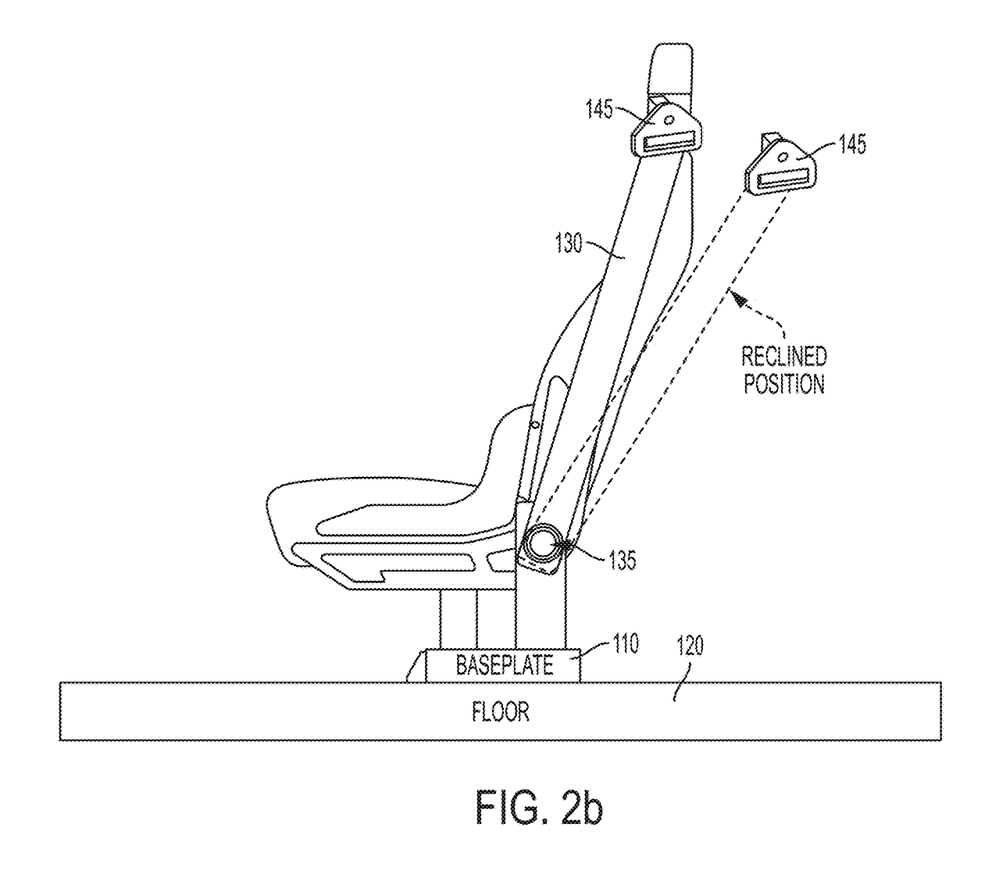
FIG. 2b shows a further example embodiment of a shoulder belt support component of these teachings.

FIGS. 2a, 2b, 2c, 2d, and 3 demonstrate exemplary retrofit seatbelt systems according to the present disclosure. Referring to FIGS. 2a and 2b, in the embodiments shown therein, a base plate 110 makes the structural base that the base plate is mounted to (e.g. floor 120 of the bus) the primary load bearing structure. In the embodiment in FIG. 2a a shoulder strap structural component 130 is rigidly attached to base plate.

Referring to FIG. 2b, in the embodiment shown therein, the shoulder strap structural component 130 includes a pivot point 135. Advantageously, the pivot point 135 may include a mechanism which that locks at this pivot point during a high force (such as a torsion force from rotation about the pivot point or a compressive or tensile force at the pivot point). The pivoting embodiment of FIG. 2b allows for the position of the shoulder strap to adjust to a reclining of the seat.

As depicted in the embodiments of both FIGS. 2A and 2B, the shoulder strap structural component 130 may advantageously be shared by two adjacent passengers/seats. Thus, as depicted, a pair of shoulder straps 140 for three-point seat belts may be secured relative to the shoulder strap structural component 130, e.g., relative to opposing sides of shoulder strap structural component. Note that in other embodiments, a single shoulder strap for a three-point seat belt may instead be secured relative to the shoulder strap structural component 130. As depicted, a shoulder strap mounting component 145 may be used to secure the shoulder strap 140 relative to the shoulder strap structural component 130, e.g., at a distal end or medial position thereof. In general, shoulder strap 140 may be secured at approximately shoulder height relative to an average passenger.

Notably, in some embodiments, the retrofit seatbelt system may allow selection of the shoulder height position, e.g., by the retrofitter, depending on the anticipated average height of the passenger. In other embodiments, the retrofit seatbelt system may allow a passenger to change the shoulder height position, e.g., by including a lock and release mechanism for translating the shoulder strap mounting component relative to the shoulder strap structural component (e.g., along a sliding track) and locking it into place once the desired shoulder height position is achieved.

In further example embodiments, the shoulder strap mounting component or shoulder strap structural component may include a shoulder strap extension/retraction mechanism for allowing the shoulder strap to extend and retract (similar to conventional seatbelts). The shoulder strap extension/retraction mechanism may include a locking feature which similar to pivot point 135 may lock in reaction to a high force (such as during an accident).

Alternatively, the shoulder strap mounting component may include a slide buckle, roller, pulley, or similar belt translation mechanism for allowing the belt to slide/translate relative thereto. In such embodiments, a distal end of the shoulder strap may advantageously be mounted relative to the baseplate 110, floor 120, or even a pedestal of the seat (see, e.g., the embodiment of FIG. 2c), e.g., using a second shoulder strap mounting component. Thus, in some embodiments, the second shoulder strap mounting component the baseplate may include a shoulder strap extension/retraction mechanism (such as described above) for allowing the shoulder strap to extend and retract.

Referring again to FIG. 2A, shoulder strap 140 may generally terminate with a buckle component 150 at a proximal end thereof. A proximal end of a belt strap 160 may be secured relative to the shoulder strap 140 e.g., in proximity to the buckle component 150 (e.g., at a proximal end of the belt strap 160), with a distal end of the belt strap 160 being secured (e.g., at or below a waist position or a seat height position) relative to the shoulder strap structural component 130, the baseplate 110, the floor 120, or the pedestal. In general, the distal end of the belt strap extends via and may be secured relative to a same side of the seat as the shoulder strap structural component 130. The buckle component 150 may be configured for association with a buckle clasp component (not depicted), which may be secured relative to a proximal end of a clasp belt 170. In general the proximal end of the clasp belt may be configured to terminate with the clasp component (e.g., at or below a waist position or a seat height position) at an opposite side of the seat relative to the shoulder strap structural. Advantageously, a distal end of the clasp belt 170 may be secured relative to to the shoulder strap structural component 130, the baseplate 110, the floor 120, or the pedestal. Thus, every point of the seat belt (in this case a three-point belt) may advantageously be secured relative to structural components other than the seat itself. In some embodiments only some of the points may be secured relative to the structural components (e.g. the distal end of the shoulder strap may be secured relative to a structural component whereas the buckle strap and waist belt strap may be secured relative to the seat).

Figure 2C:
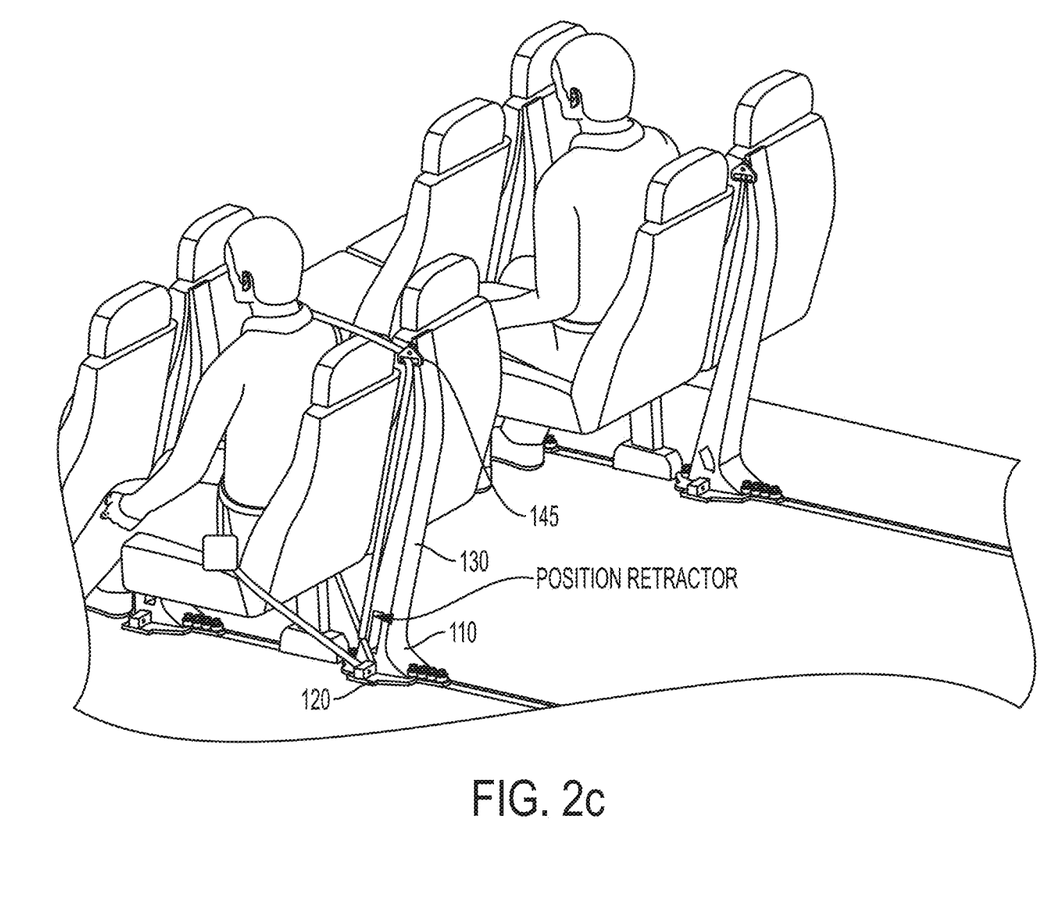
FIG. 2c shows another example embodiment of a retrofit seatbelt design of these teachings.

With reference now to FIG. 2c, an example embodiment is depicted wherein the retrofit seatbelt system is floor mounted and therefore not reliant on any particular bus seating configuration. In particular, the baseplate 110 and shoulder strap structural component 130 are configured for mounting relative to the floor 120 such that the shoulder strap structural component 130 is positioned behind the seat. Advantageously in such embodiments (and as may be the case in other embodiments as well), the shoulder strap structural component 130 may include a concave portion curved toward the seat. Moreover, the shoulder strap structural component 130 and baseplate 110 may be configured such that an angle of the structural component 130 generally matches an angle of the seat (e.g., in an upright or reclined position) when the shoulder strap structural component 130 is mounted relative to the floor. Likewise, the a concave curvature may of the shoulder strap structural component 130 may substantially correspond to the shape of the seat when the shoulder strap structural component 130 is mounted relative to the floor. In some embodiments, the curvature may position an upper portion of the shoulder strap structural component above a position retractor for the shoulder strap. In some embodiments, the shoulder strap structural component and/or the baseplate may include a forward extending structural member for forward positioning one or more of the set belt securing locations (e.g., forward positioning the to the buckle clasp/anchor belt securing point) relative to the shoulder strap structural component. In example embodiments the shoulder strap structural component 130 may be optimized I-beam geometry that varies along its length, e.g., to minimize weight and enable strength requirement satisfaction for maximum anticipated crash loads. (32)

Figure 2D:
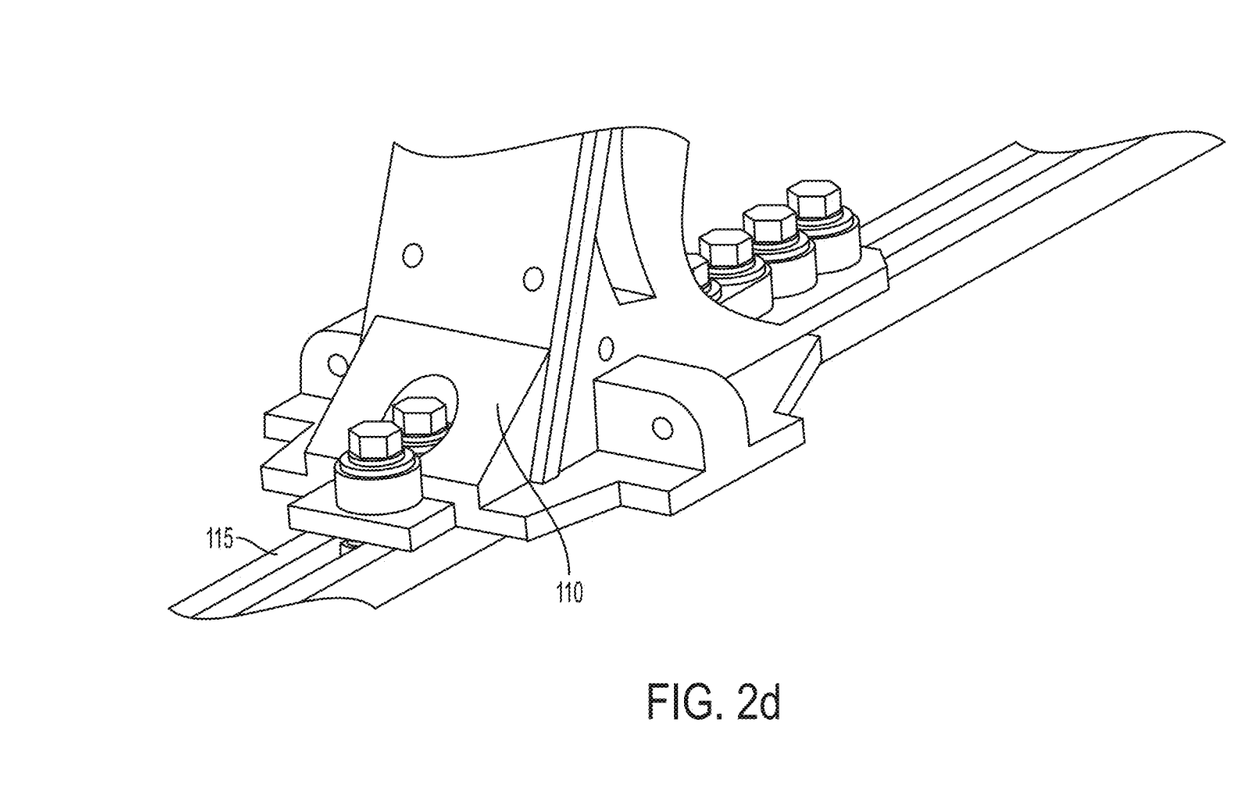
FIG. 2d shows a view of an example attachment structure for an example embodiment of the retrofit seatbelt design of these teachings.
Figure 6:
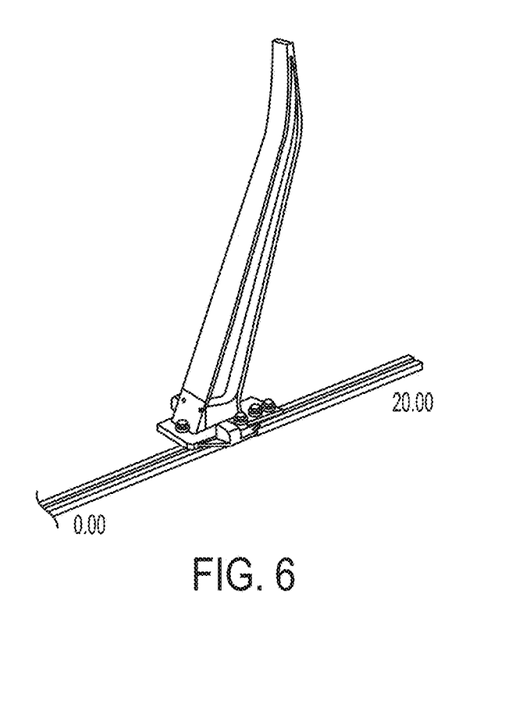
FIG. 6 depicts an exemplary offset mounting design for an example shoulder strap support component of these teachings.

Referring to FIG. 2d, the embodiment shown therein depicts details of mounting an exemplary baseplate 110 to a floor track 115, using 6 T-bolts and washers. It is noted that a t-rail track is a steel component which runs the length of the motor coach and is welded to the structure of the bus along its length in some of the motor coach structural designs. Thus, the baseplate may advantageously be mounted relative thereto, e.g., utilizing the mounting features described and depicted in FIG. 2d or other features. Notably, some t-rails are not located directly in the middle of a seat or seat pair. Thus, in some embodiments the systems and methods disclosed herein may incorporate an offset between the baseplate mounting points and an axis of the shoulder strap structural component (see, e.g., FIG. 6).

It is also noted that in some embodiments, a length of a base of the seat pedestal can vary. This may pose a challenge with positioning the shoulder strap structural component. behind the seat, as the pedestal may interfere with the baseplate. If, however, the shoulder strap structural component. is positioned too far behind the seat, then it may intrude on the leg room of occupants making it difficult for them to move in and out of the seat. Accordingly, in some embodiments, an offset between the baseplate mounting points and an axis of the shoulder strap structural component may account for this issue. In some embodiments, the minimum space clearance required at knee height between the shoulder strap structural component and the seat behind it is approximately 7-8 inches (which provides approximately 4-5 inches behind seat in front for the shoulder strap component assuming a front to back seat to seat distance of approximately 12 inches.

Figure 7A:
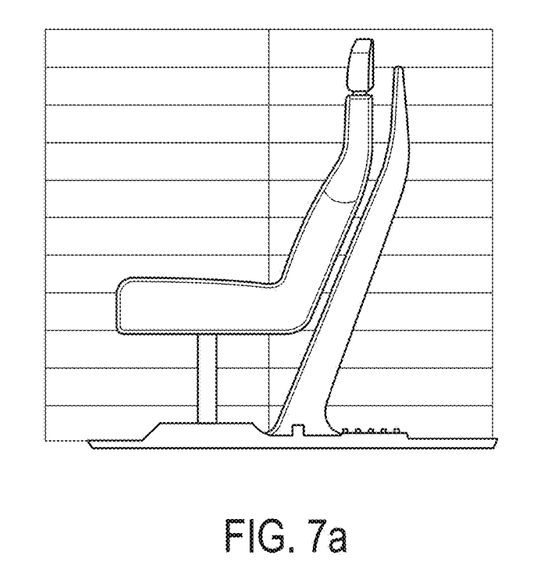
FIGS. 7a and 7b depict installed and uninstalled instances, respectively, of an example baseplate enabled for sharing bolt holes with the pedestal base of the seat in front of it, according to these teachings.
Figure 7B:
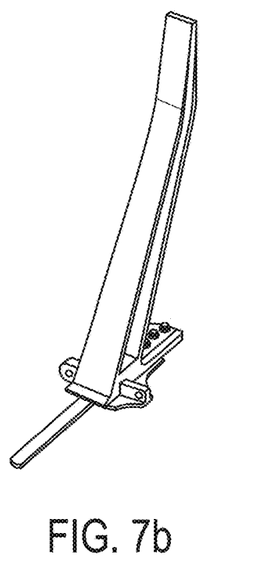
Figure 8A:
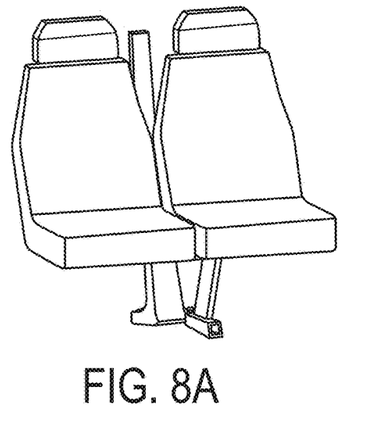
FIGS. 8a and 8b depict installed and uninstalled, respectively, instances of an example offset baseplate enabled for sharing bolt holes with the pedestal base of the seat in front of it, according to these teachings.
Figure 8B:
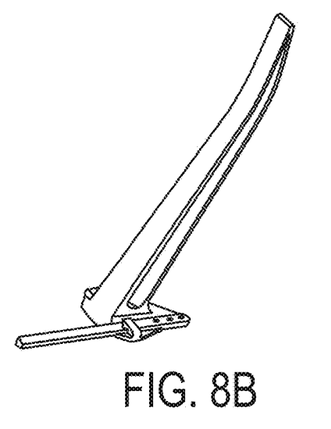
Figure 9A:
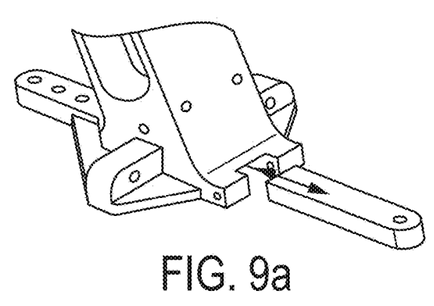
FIGS. 9e and 9b depict an adjustable baseplate enabled for sharing bolt holes with the pedestal base of the seat in front of it, according to these teachings.
Figure 9B:
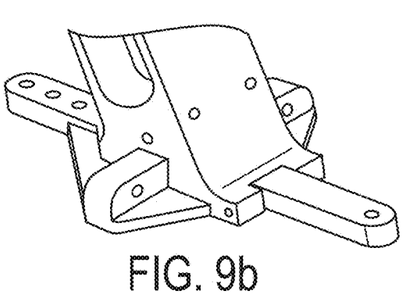

In some embodiments the baseplate may be configured so as to enable sharing bolt holes with the pedestal base of the seat in front of it (see, e.g., FIGS. 7a and 7b). In some embodiments, this configuration may include an offset bolt sharing component (see, e.g., FIGS. 8a and 8b). In other embodiments, the bolt sharing component of the baseplate may be adjustable in length (see, e.g., FIGS. 9a and 9b) Advantageously, the sharing of bolt holes may allow a much tighter placement of the shoulder strap structural component relative to the seat backing, which can make the seat belt much more comfortable for passengers sitting behind it. Furthermore, this design configuration may strengthen the inertia of the base of the system at the critical bolt locations, because this assembly combines the inertia of the extended base plate, seat pedestal, and t-rail at these bolt locations to provide a stronger design to resist the bending moments exerted by the worst case frontal crash scenario.

Figure 10A:
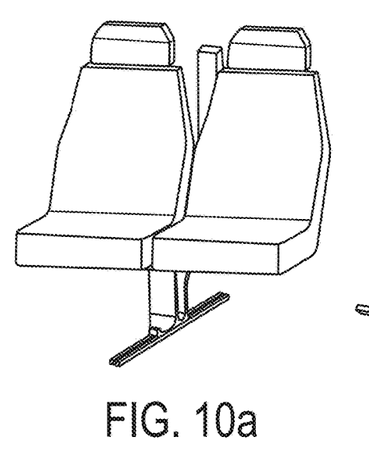
FIGS. 10a-10b depict an example embodiment of a retrofit seatbelt design, according to these teachings, wherein the shoulder belt support component and baseplate are configured to replace the pedestal of an existing seat.
Figure 10B:
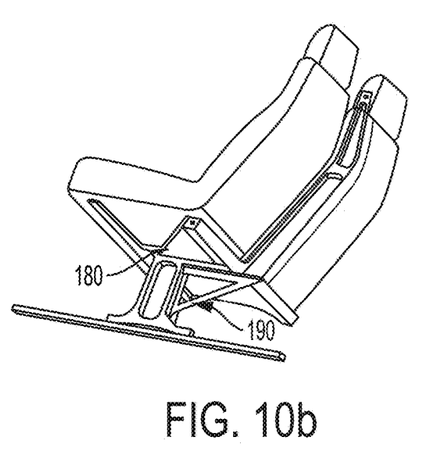
Figure 10C:
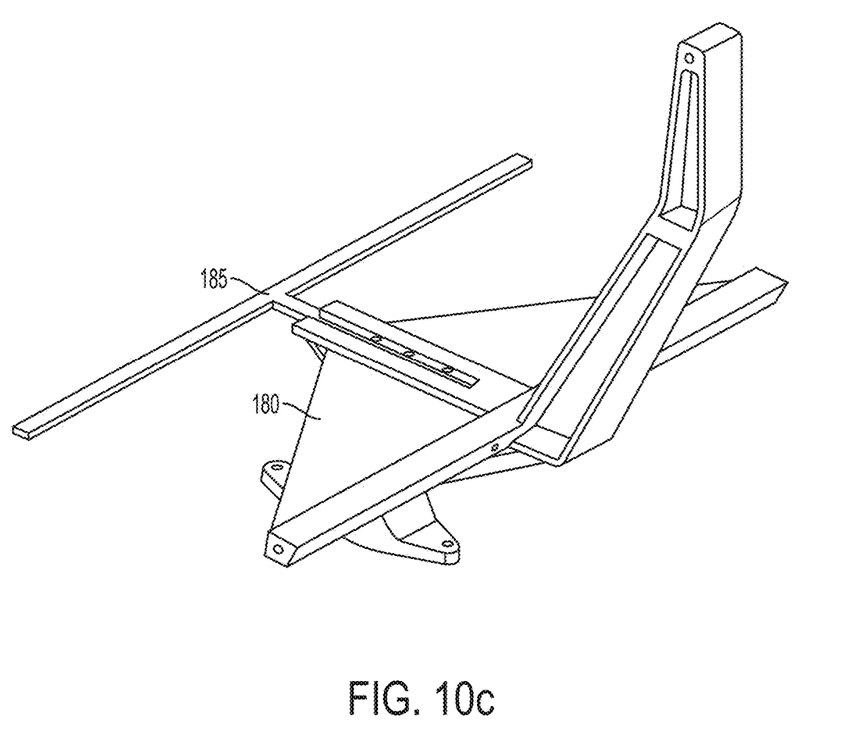
FIG. 10c depicts an example embodiment of an adjustable seat mounting component with an integrated shoulder strap support component, according to these teachings.

In further embodiments, the baseplate and shoulder strap structural component may be configured for replacing a pedestal of an existing seat. Thus, for example, as depicted in FIGS. 10a and 10b, the baseplate or shoulder strap structural component may include a seat mounting component 180 for mounting the seat(s) with respect thereto. Moreover the baseplate my include a support truss 190 for strengthening an offset position of the shoulder strap structural component (offset to the rear) as well as for providing a mounting surface for the seat mounting component 180 (e.g., in the event that the seat mounting component 180 is a separate or integral part of shoulder strap structural component). FIG. 10c shows and example seat mounting component 180 which is integral with the shoulder strap structural component. Notably, as depicted, the seat mounting component may include a front rail 185 with may be adjustable so as to accommodate different seat sizes.

Figure 3:
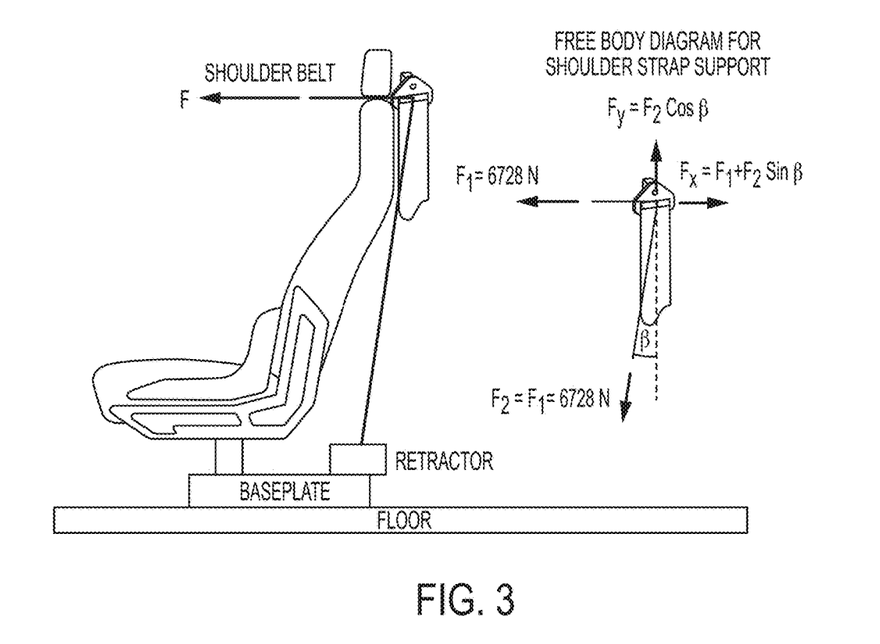
FIG. 3 depicts a free body diagram for an example shoulder strap support component of these teachings.
Figure 4:
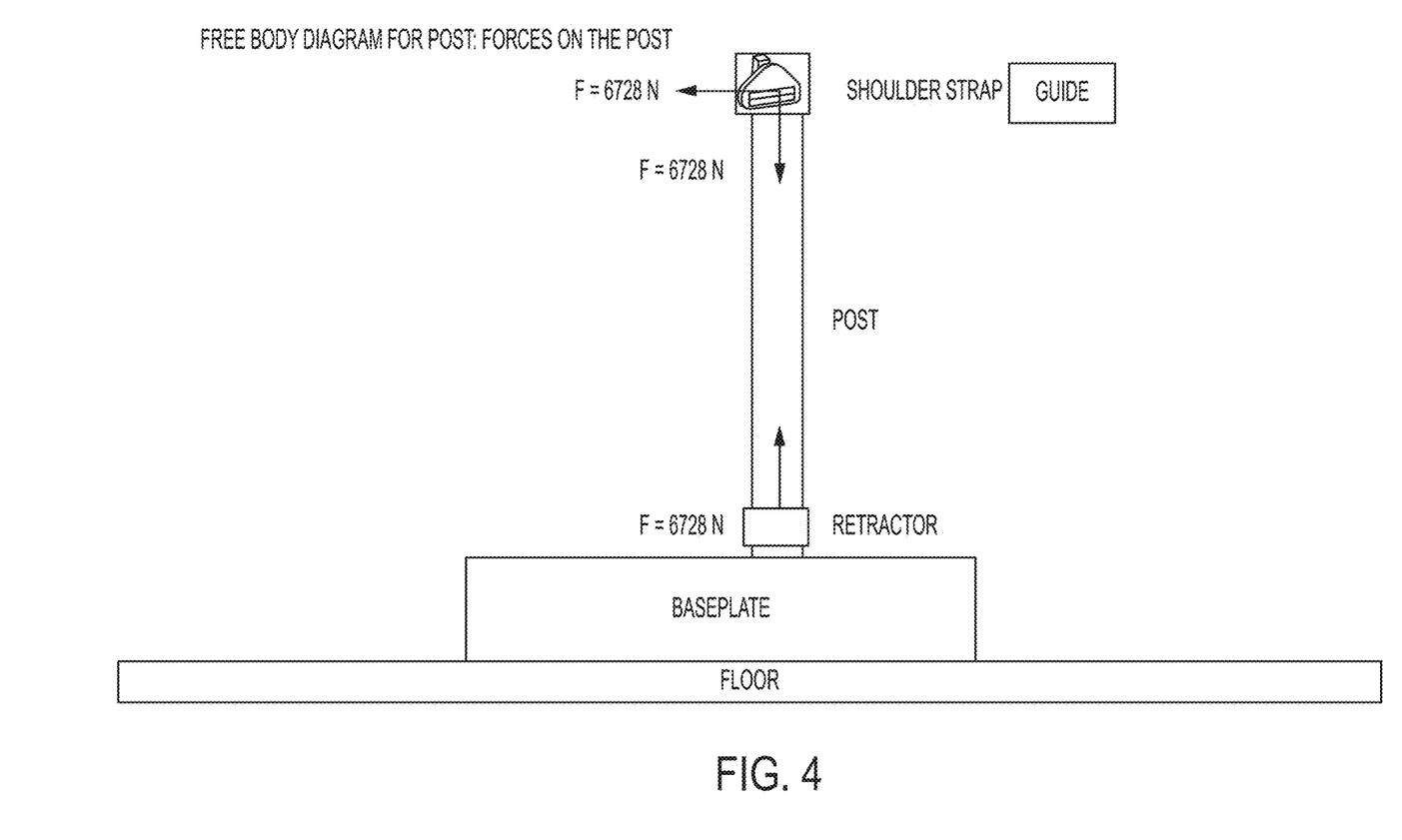
FIG. 4 depicts a free body diagram for another example shoulder strap support component of these teachings.

With reference now to FIG. 3 a free body diagram is depicted of the shoulder strap and a shoulder strap guide component. In the embodiment shown in FIG. 3, the retractor for the shoulder strap is disposed on the base plate. Embodiments in which the retractor for the shoulder strap is disposed on the post, as shown in FIG. 4, are also within the scope of these teachings.

One concept of the present teachings is to transmit the forces, occurring in an accident, directly to the floor, while the seat frame and the pedestal do not serve as primary structures for these forces. This is necessary because these old seats were not designed to withstand the forces that occur in case of an accident. This feature is accomplished through a base plate anchored to the bus floor, which serves as central connection point for all anchor points of the seat belt assembly. This imposes little requirements to the seat frame and pedestal, what makes the design a universal retrofit option that can be applied to various seats. Analysis has shown that it is desirable to have a symmetric design. This means, that the retrofit system can be mounted in the middle of a pair of seats. Having one system for every two seat will reduce the components that are needed. Retractor, webbing and buckle can be bought as standard components from suppliers, in order to keep costs low.

Figure 5:
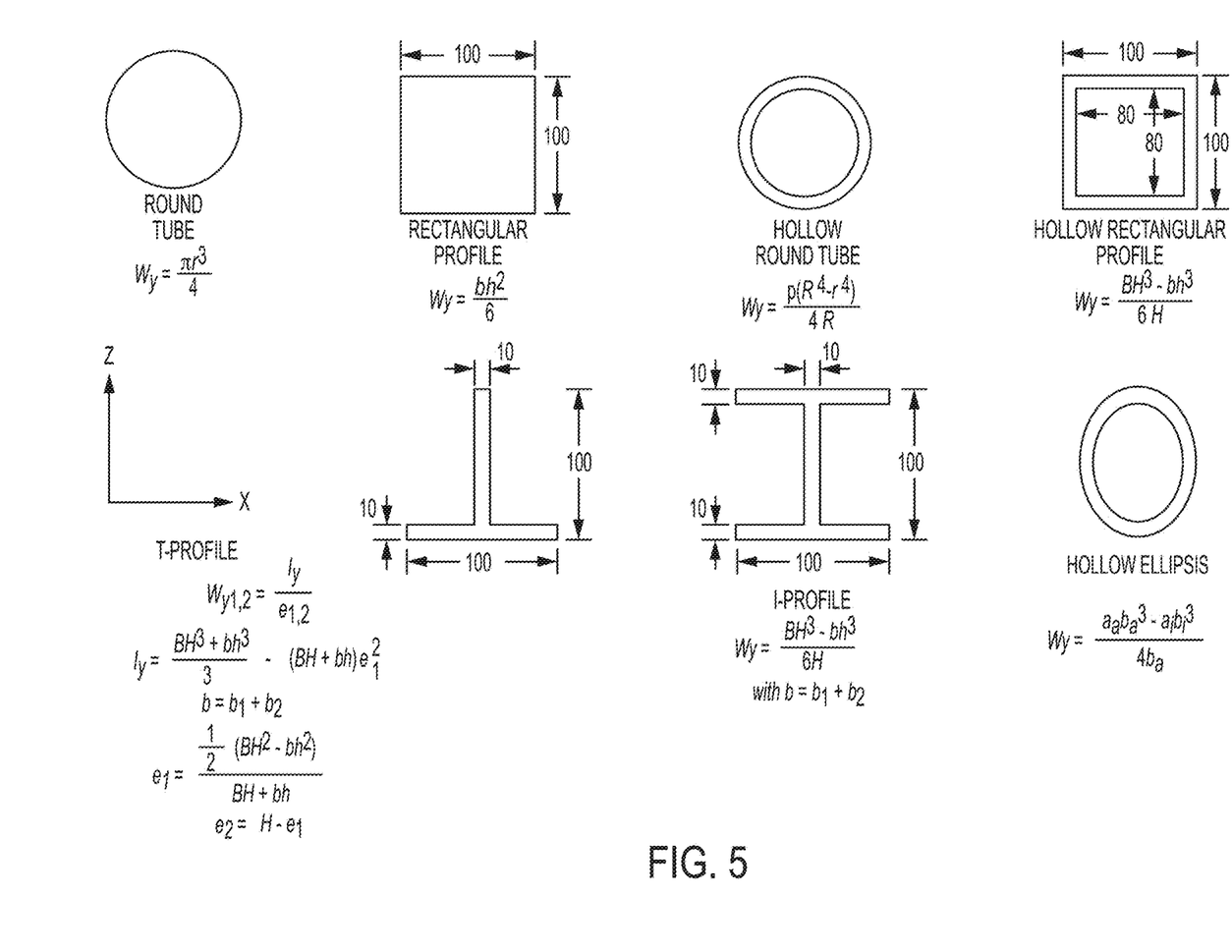
FIG. 5 shows different exemplary shapes with dimensions and section modulus for the retrofit seatbelt design of these teachings.

The shoulder strap guide component helps to keep the shoulder belt in position. In addition to that, the shoulder belt changes its direction at the shoulder strap guide component. For the dimensioning, the shoulder strap component (also referred to as the "post") can be regarded as a straight cantilever beam. In this case it is important to mention, that the post will be used to mount two shoulder strap supports and two retractors, as shown in FIG. 3. This is because the post will be used for the right and the left seat. For the design of the post, different basic shapes can be considered. The use of simple shapes has the benefit that the material can be bought as stock items. The following shapes have been compared: Round Tube, Rectangular Profile, Hollow Round Tube, Hollow Rectangular Profile, T-Profile, I-Profile and Hollow Ellipsis. FIG. 5 shows Different Shapes with dimensions and section modulus. In one embodiment, the I-Profile has been chosen because it offers the biggest section modulus relatively to the cross section area.

In order to achieve the optimal geometry for the systems and methods disclosed herein, in some embodiments, the baseplate and/or the shoulder strap structural component may be manufactured using a casting process (either as separate components or as a single integral component). It may be advantageously to that the baseplate and/or the shoulder strap structural component be produced in two symmetrical halves and then secured (e.g., welded together) at the midline. For the purposes of casting it may be useful that the surfaces are substantially contiguous with smooth transitions therebetween.

The following are incorporated by reference herein in their entirety and for all purposes:
1. Office of the Federal Register National Archives and Records Administration. US Government Printing Office. *Code of Federal Regulations (annual edition) Title 49-Transportation*. [Online] Oct. 1, 2003. [Cited: Mar. 22, 2014.]http://www.gpo.gov/fdsys/pkg/CFR-2003-title49-vol1/pdf/CFR-2003-title49-vol1.pdf.

2. Department of Transportation, National Highways Traffic Safety Administration. Federal Motor Safety Standards; Occupant Crash Protection. Nov. 20, 2013.

3. National Highway Traffic Safety Administration. NHSTA Home. [Online] [Cited: Mar. 22, 2014.] http://www.nhtsa.gov/.

4. US Department of Transportation. Federal Motor Vehicle Safety Standards. [Online] Feb. 28, 2014. [Cited: Mar. 22, 2014.] http://www.fmcsa.dot.gov/rules-regulations/administration/fmcsr/FmcsrGuideDetails.aspx?menukey=571.

5. govtrack. govtrack.us—H.R. 873 (112th): Motorcoach Enhanced Safety Act of 2011. [Online] Mar. 2, 2011. [Cited: Mar. 22, 2014.] https://www.govtrack.us/congress/bills/112/hr873.

6. Transportation, US Department of. Federal Motor Vehicle Standard § 571.209. [Online] Oct. 28, 2013. [Cited: Feb. 7, 2014.] http://www.fmcsa.dot.gov/rules-regulations/administration/fmcsr/printRegulation.aspx?print_opt=N&preg=571.209.

7. National Highwy Traffic Safety Administration. Federal Motor Vehicle Safety Standards—Definition FMVSS No. 210. [Online] 1998. [Cited: Mar. 22, 2014.] http://www.nhtsa.gov/cars/rules/import/FMVSS/#SN210.

8. Administration, National Highway Traffic Safety. Fatality Analysis Reporting System (FARS) Encyclopedia. [Online] Nov. 14, 2013. [Cited: Feb. 4, 2014.] http://www-fars.nhtsa.dot.govNehicles/VehiclesBuses.aspx.

9. Limousine, Charter & Tour Magazine. [Online] Aug. 4, 2010. [Cited: Feb. 2, 2014.] http://www.lctmag.com/vehicles/news/13249/safety-breakthrough-greyhound-gets-213-buses-with-seat-belts.

10. *Retrofit Proposal*. Krishnamurty, Sundar. 2012.

11. Albertson, Pontus and Falkmer, Torbjörn. Is there a pattern in European bus and coach incidents? A literature analysis with special focus on injury causation and injury mechanisms. *Accident Analysis and Prevention* 37. Mar. 22, 2004, pp. 225-233.

12. RONA Kinetics and Associates Ltd., North Vancouver, B.C. Evaluation of Occupant Protection in Buses. Jun. 4, 2002, p. 138.

13. Gillan, Jaqueline. How Best to Improve Bus Safety on our Nation's Highways. Washington, D.C.: s.n., Jun. 13, 2011.

14. Griffiths, Michael, Paine, Miachael and Moore, Renae. Three Point Seat Belts on Coaches—The first Decade in Australia. *Proceedings of the 19th International Technical Conference on the Enhanced Safety of Vehicles*. June 2005.

15. Industries, Motor Coach. 2014 MCI D-Series. [Online] 2014. [Cited: February 2014, 2014.] http://www.mcicoach.com/luxury-coaches/passengerDseries.htm.

16. Transportation, Federal Register—Department of. 49 CFR Part 571. *Federal Motor Vehicle Safety Standards; Occupant Crash Protection: Final Rule*. Nov. 25, 2013.

17. National Highway Traffic Safety Administration—Department of Transportation. Final Regulatory Impact Analysis FMVSS No. 208 Lap/Shoulder Belts for All Over-The-Road Buses, and Other Buses With GVWRs Greater Than 11,793 kg. September 2013.

19. Mayer, Hans W. Frankfurter Allgemeine Zeitung. [Online] Mar. 4, 2009. [Cited: Mar. 3, 2014.] http://www.faz.net/aktuell/technik-motor/auto-verkehr/dreipunkt-gurt-vom-lederriemen-zum-high-tech-lebensretter-1771604.html.

20. The Swedish Patent and Registration Office. PRV—The Swedish Patent and Registration Office. [Online] Mar. 3, 2014. [Cited: Mar. 4, 2014.] http://www.prv.se/en/Patents/Why-apply-for-a-patent/Examples-of-patents/Life-saving-invention/.

21. US Department of Transportation NHTSA. National Highway Traffic Safety Administration. *Primary Enforcement Saves Lives*. [Online] September 2006. [Cited: Mar. 3, 2014.] http://www.nhtsa.gov/people/injury/enforce/PrimaryEnforcement/images/PrimaryEnforcement.pdf.

22. wikipedia. Wikipedia—Sicherheitsgurt. [Online] March 2014. [Cited: Mar. 3, 2014.] http://de.wikipedia.org/wiki/Sicherheitsgurt.

23. Department of Transportation—National Highway Traffic Safety Administration. Federal Motor Vehicle Standards; Occupant Crash Protection; Final Rule. Nov. 25, 2013.

24. Advocates for Highway and Auto Safety. [Online] Jan. 27, 2014. [Cited: Feb. 13, 2014.] http://www.saferoads.org/.

25. Kovac, David. *Restraint System for Vehicle*. USPA 20110210598 A1 USA, Feb. 17, 2011.

26. Liehr, Peter Albert Helmut. *Criss-Cross Harness system for Use with Seats*. US 20090079252 A1 USA, Sep. 19, 2008.

27. Mc Cauley, Blake J. *Portable Safety Belt*. U.S. Pat. No. 8,371,656 B2 USA, Jan. 6, 2010.

28. Google. Google Patents. [Online] February 2014. [Cited: Feb. 1, 2014.] https://vvww.google.com/patents/US20100171359?dq=US+20100171359+A1&hI=de&sa=X&ei=vaztUsHtBdSksQTp2IDwAQ&ved=0CDgQ6AEwAA.

29. Symonds, Barbara J. *Portable Seat Belt*. U.S. Pat. No. 5,624,135 A USA, Apr. 29, 1997.

30. Walton, Clint, et al., et al. *Over-the shoulder portable seatbelt*. US20080246265 A1 USA, Oct. 9, 2008.

31. Vogel, Heiner and Weiler, Klaus. *Passenger seat with seat belt attachment to the column*. DE19745634 C2 Germany, Okt. 16, 1997.

32. National Highway Traffic Safety Administration. *NHSTA's Motorcoach Safety Research Crash, Sled, and Static Tests*. s.I.: US Department of Transportation, 2010. DOT HS 811 355.

33. Barrat, Mary A. *Passenger Restraint System*. U.S. Pat. No. 4,632,425 A USA, Jul. 8, 1985.

34. Brewer, Christine. *Passenger Restraint Assembly for School Buses*. U.S. Pat. No. 6,676,219 B1 USA, Jan. 3, 2003.

35. Rosso, Jefferey. *Double Seatbelt Anchor Bracket*. U.S. Pat. No. 7,651,134 B2 USA, Mar. 14, 2006.

36. Murphy, Gary H., Temple, George E. and Dudemann, Keith A. *Occupant Restraint System with Compartmentalization*. U.S. Pat. No. 6,312,056 B1 USA, Dec. 31, 1998.

37. Schmidt, Gerhard. *Motor caravan with a fastening device for safety belts*. DE 4333463 A1 Germany, Sep. 30, 1993.

38. Schultz, Fred B., et al., et al. *Seat Frame Assembly for a Motor Vehicle*. U.S. Pat. No. 5,564,785 A USA, Oct. 17, 1994.

39. Transportation, US Department of. US Department of Transportation Federal Motor Carrier Safety Administration. [Online] Oct. 28, 2013. [Cited: Feb. 2, 2014.] http://vvww.fmcsa.dot.gov/rules-regulations/administration/fmcsr/fmcsrruletext.aspx?reg=571.209.

40. Transportation, US Department of. US Department of Transportation Federar Motor Carrier Administration. [Online] Oct. 28, 2013. [Cited: Feb. 2, 2014.] http://www.fmcsa.dot.gov/rules-regulations/administration/fmcsr/fmcsrruletext.aspx?reg=571.210.

41. Ghatage, Ramesh. *Seat Belt Guide and Assembly*. USPA 20090008983 A1 USA, Jan. 17, 2008.

42. Google. Google Patents. [Online] February 2014. [Cited: Feb. 2, 2014.] www.google.com/patents.
43. (WIPO), World Intellectual Property Organization. World Intellectual Property Organization (WIPO) International Patentscope. [Online] February 2014. [Cited: Feb. 2, 2014.] http://patentscope.wipo.int/search/en/search.jsf.
44. (USPTO), US Patent and Trademark Office. USPTO Patent Database. [Online] January 2014. [Cited: Jan. 28, 2014.] http://www.uspto.gov/web/patents/classification/index.htm.
45. *Anatomy of a U.S. Patent Document*. White, Michael. 2008, Librian for Research Services, p. 2.
46. Ullman, David G. *The Mechanical Design Process*. New York: McGraw-Hill Companies Inc., 1997.
47. Foundation, Sara's Wish. Sara's Wish Foundation. [Online] February 2014. [Cited: Feb. 5, 2014.] http://www.saraswish.org/.
48. Transportation, National Highway Traffic Safety Administration—Department of. Final Regulatory Impact Analysis FMVSS No. 208 Lap/Shoulder Belts for All Over-The-Road Buses, and Other Buses With GVWRs Greater Than 11,793 kg. September 2013.
49. Setra. Setra Coaches. [Online] March 2014. [Cited: Mar. 15, 2014.] http://setra-coaches.com/.
50. Crean, Chris. *Questions on Costs and Additional Weight for a Retrofit System*. [interv.] Douglas Eddy. Mar. 14, 2014.
51. US Department of Transportation—Federal Motor Safety Administration. Motorcoach Safety Advisory Bulletin: Exceeding Tire Load Ratings. [Online] Jul. 4, 2013. [Cited: Mar. 12, 2014.] http://www.fmcsa.dot.gov/documents/alerts/Motorcoach_Safety_Advisory_Bulletin_Exceeding_Tire_Load_Ratings.pdf.
52. US Department of Transportation. Federal Motor Vehicle Safety Standard § 571.210. [Online] Oct. 28, 2013. [Cited: Feb. 20, 2014.] http://www.fmcsa.dot.gov/rules-regulations/administration/fmcsr/printRegulation.aspx?print_opt=N&preg=571.210.
53. PTC Product & Service Advantage. Creo Mankin Extension. [Online] PTC, 2014. [Cited: Apr. 7, 2014.] http://wwvv.ptc.com/products/creo-elements-pro/manikin/whats-new.htm.
54. National Transportation Safety Board. Highway Accident Report. *Motorcoach Run-Off-The_Road Accident Tallulah, La. Oct.* 13, 2003. Washington D.C.: s.n., 2005.
55. finanzen.net. Rohstoffe, Rohstoffpreise, Rohstoffkurst, finanzen.net. [Online] Apr. 13, 2014. [Cited: Apr. 14, 2014.] http://www.finanzen.net/rohstoffe/.
56. Todd, Robert H and al., et. *Manufacturing Processes Reference Guide, First Edition*. New York: Industrial Press, 1994.
57. Borrego, Paulina. *Patent Search*. [interv.] Douglas Eddy and Conrad Zanzinger. Jan. 24, 2014.

Other embodiments and further details of the above disclosed embodiments are presented in the Appendixes which follow:

Although these teachings has been described with respect to various embodiments, it should be realized these teachings is also capable of a wide variety of further and other embodiments within the spirit and scope of the these teachings.

The invention claimed is:

1. A system for retrofitting a seat mounted to a vehicle with a three-point seatbelt, the seat being connected to a floor of the vehicle by a pedestal, the system comprising:
   a baseplate for securing the system to the floor, wherein the baseplate mounts directly to the floor or a floor track mounted to the floor, and provides an anchor point for seatbelt webbing, the anchor point transferring seatbelt loads directly to the floor;
   a shoulder strap mount coupled to the distal end of the shoulder strap support and configured for slidingly securing a shoulder strap of the seatbelt to the shoulder strap support;
   wherein:
   the shoulder strap support includes a pivot disposed intermediate the distal end and proximate end, wherein a portion between the pivot and the proximate end extends perpendicularly from the baseplate; and
   the shoulder strap support rotates about the pivot to be positioned in alignment with a back of the seat when the seat is reclined.

2. The system of claim 1, wherein the baseplate includes one or more T-bolts extending therefrom for coupling the baseplate to the floor track.

3. The system of claim 2, wherein the baseplate includes a bolt mounting portion at a side thereof for receiving the one or more T-bolts and fixedly coupling the baseplate to the floor track, wherein the bolt mounting portion is offset from the proximate end of the shoulder strap support.

4. The system of claim 3, wherein the bolt mounting portion includes a first projection, wherein when installed in the floor track, the first projection extends in a forward direction along a first axis, wherein the first projection receives the pedestal and bolts for mounting the pedestal to the floor track.

5. The system of claim 4, wherein the first projection is offset from the proximate end of the shoulder strap support.

6. The system of claim 5, wherein the first projection is adjustable along the first axis.

7. The system of claim 4, wherein the shoulder strap support is symmetric about a widthwise middle of the shoulder strap support and configured for symmetrically retrofitting a plurality of seatbelts to a corresponding plurality of seats.

8. The system of claim 1, wherein the shoulder strap support is offset in a rearward direction along a first axis relative to the baseplate.

9. The system of claim 1, wherein the baseplate includes a support truss member.

10. The system of claim 1, wherein the baseplate and shoulder strap support are integrally formed.

* * * * *